March 9, 1954 R. A. AJELLO 2,671,330
CANDLE
Filed Sept. 27, 1951
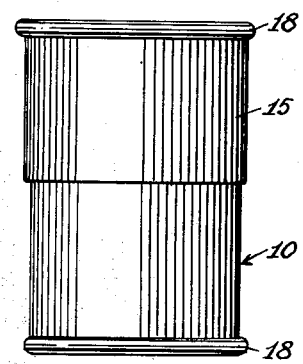
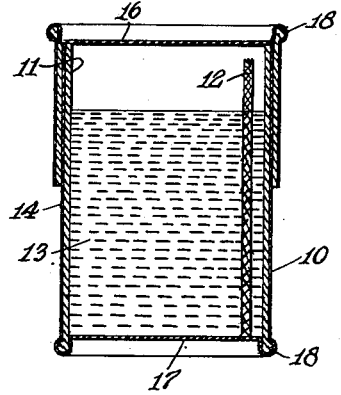
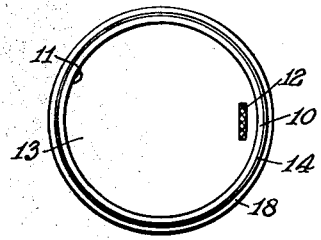
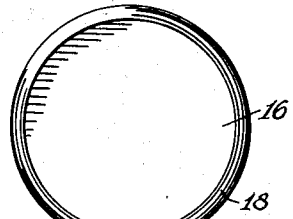
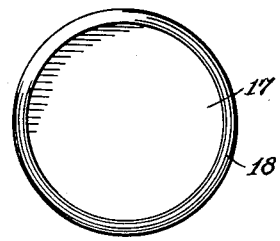
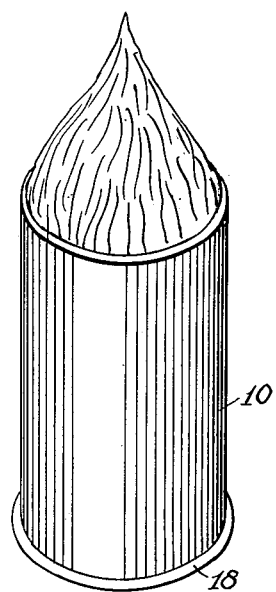
INVENTOR.
RALPH A. AJELLO
BY
ATTORNEY Patented Mar. 9, 1954

2,671,330

UNITED STATES PATENT OFFICE 2,671,330

CANDLE

Ralph A. Ajello, Mamaroneck, N. Y.

Application September 27, 1951, Serial No. 248,524

1 Claim. (Cl. 67—21)

This invention pertains to new and useful improvements in candle lights, and it has for its object to provide a candle, which is sturdy and infallible in use under all conditions, and very adaptable for emergencies.

Thus some of the advantages of the said device are: the use of the latter as a roadside flare, for instance during construction work; for lighting indoor and outdoor fires; for use as an insect repellent and air refresher, when the wax of the candle has been subjected to the proper chemical treatment; for emergency light indoors in case of power failures; for outdoor safety flares, for campers and motorists; further, as a heat source for grilling and cooking; and as a fireplace lighter, as no kindling is needed.

These are some of the advantages incidental to this unique candle, due to its specific construction.

The said advantages may be defined as residing in, that said candle, which is of a comparatively broad cylindrical shape will not blow out, once it is lit; this result is obtained by having the body of said candle encased in a paper container impregnated with wax, while the wick is placed in close proximity to the wall of said container and on one side of the latter, so that said wick upon being lit will immediately ignite the wax impregnated paper wall of the container, while at the same time drawing nourishment from the cylindrical wax, or candle body proper.

The result upon lighting this candle will thus be manifested in, or appear as a broad solid cylindrical fire of a preferably reddish color, having both heating and lighting characteristics.

It is essential that the paper of the container, which inner side becomes laminated by the coating of the wax, is rather stiff in order to keep the shape of the candle throughout the burning of the latter; further as an additional aid in this regard and for shipping purposes, in order to resist heat, said paper container is surrounded by a suitable thin metallic foil.

A cover is mounted on the upper end of the foil-coated container, and the top of said cover and bottom of the container are each provided with a solid metallic surface, respectively, for rigidity and protection sake, for instance in shipping.

The said device may also be used as a lubricating stick for tools, etc., by changing the wax to a thinner, or semi-solid fluid; in this instance the container may also, if desired, be given a slightly different shape.

With the above and other objects in view, this invention consists of the novel features of construction, combination and arrangement of parts, hereinafter fully described, claimed and illustrated in the accompanying drawings forming part of this application, and in which similar characters of reference indicate corresponding parts in all views, and in which:

Figure 1 is a side elevational view of my candle light device, with the cover mounted on the container.

Figure 2 is a top plan view of my candle light device with the cover removed.

Figure 3 is a transverse sectional view of the device, as shown in Figure 1.

Figures 4 and 5 are top and bottom views of the device, showing the solid metallic end surfaces of the foil-coated container; while Figure 6 is a perspective elevational view, showing the candle, when lit.

Referring more particularly to the drawing, the numeral 10 indicates a cylindrical container filled with a suitable candle wax 13, as hereinbefore described; said container is provided with a wax-impregnated, or somewhat slowly combustible inner wall, or casing 11, of paper, extending the full height of the container; a wick 12 is disposed through the body of the candle wax and in close proximity to the wall 11.

In order to securely retain the form of this candle light, while burning; to support the wall or casing 11; and, further, to make this article resistant to heat, for instance, in shipping, a coating of metallic foil 14, or a thin metal cover, surrounds said paper wall 11.

The container is provided with a cover 15 similarly constructed, as said container 10; this cover, while forming a closure for the wax candle before use, may also be employed to extinguish the fire of said candle, when burning.

The top of the cover 15 and the bottom of the container 10 consist of metal disks 16 and 17 secured to said top and bottom by means of flanges 18.

It is obvious that changes may be made in the form, construction and arrangement of the several parts, as shown, within the scope of the appended claim, without departing from the spirit of the invention, and I do not, therefore, wish to limit myself to the exact construction shown and described herein.

What I claim as new, and desire to secure by Letters Patent of the United States is:

A quick-lighting candle, non-extinguishable by wind, comprising a substantially stiff paper container impregnated by wax, a candle-wax compound filling said container, a wick arranged in said candle-wax in very close proximity to the inner wall of said container and adapted, when lit, to simultaneously ignite the wax impregnated wall of the container, and subsequently draw nourishment from the wax compound in the container, and a metallic coating upon the outer surface of the wall of said container, whereby to retard the burning of the paper wall of the container, and impart rigidity to the latter, a top cover for said container, the upper surface of said cover and the bottom of the container consisting of metal disks.

RALPH A. AJELLO.

References Cited in the file of this patent

UNITED STATES PATENTS

| Number | Name | Date |
|---|---|---|
| 1,960,288 | Sherman | May 29, 1934 |
| 2,168,698 | Bunt et al. | Aug. 8, 1939 |
| 2,323,804 | Driscoll | July 6, 1943 |
| 2,622,017 | Bramhall et al. | Dec. 16, 1952 |

FOREIGN PATENTS

| Number | Country | Date |
|---|---|---|
| 21,374 | Great Britain | 1896 |